April 8, 1924. 1,489,750
L. V. FRALEY
POWER TRANSMISSION MECHANISM
Filed Nov. 29, 1918 2 Sheets-Sheet 1

Witnesses:
W. F. Kilroy
Harry B. White

Inventor:
Lawrence V. Fraley
By Brown Hanson & Boettcher
Attys.

April 8, 1924.
L. V. FRALEY
POWER TRANSMISSION MECHANISM
Filed Nov. 29, 1918
1,489,750
2 Sheets-Sheet 2
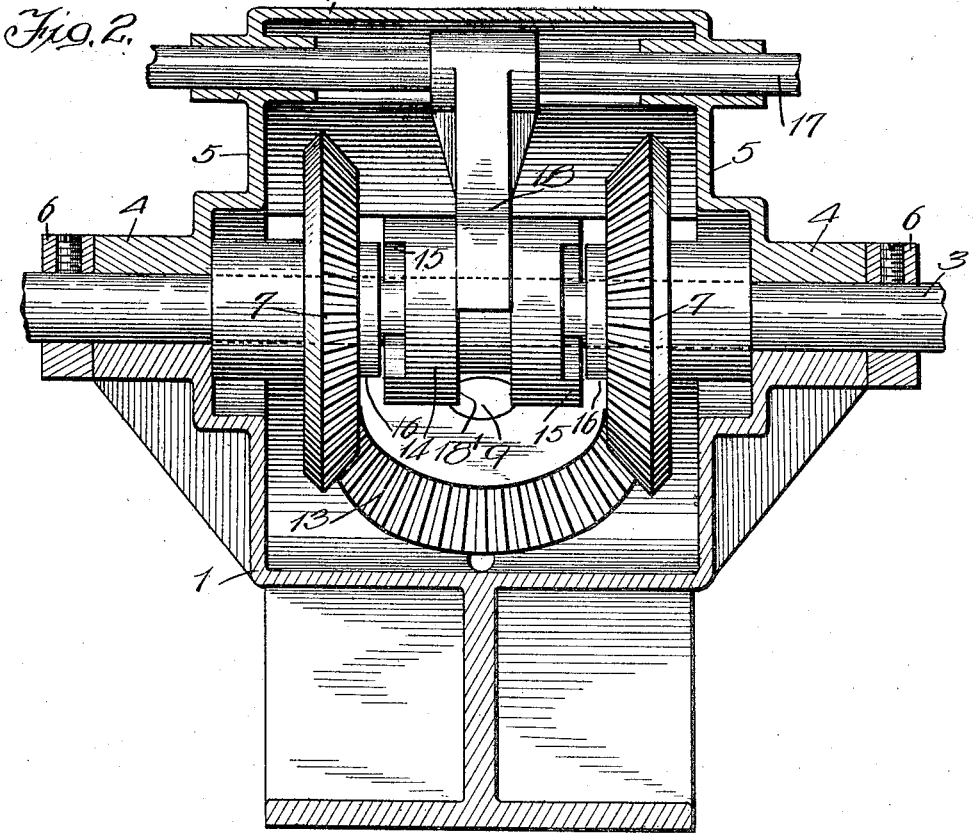
Fig. 2.
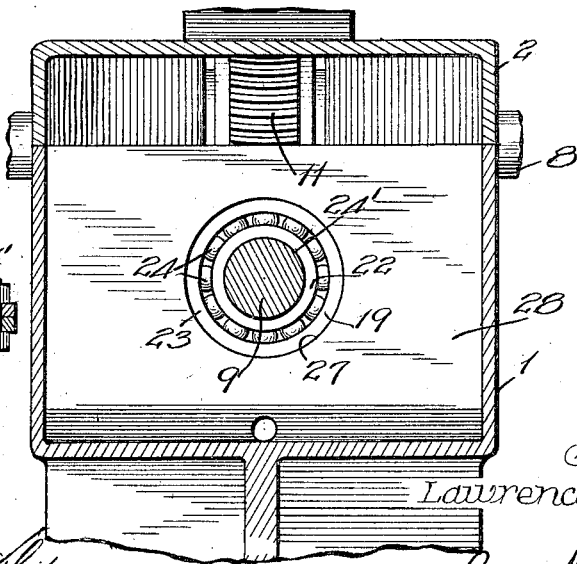
Fig. 3.
Fig. 4.
Witnesses:
W. F. Kilroy
Harry E. White
Inventor:
Lawrence V. Fraley
By Brown Hanson Boettcher
Attys.

Patented Apr. 8, 1924.

1,489,750

UNITED STATES PATENT OFFICE.

LAWRENCE V. FRALEY, OF CHICAGO, ILLINOIS, ASSIGNOR, BY MESNE ASSIGNMENTS, TO STANDARD CONVEYOR COMPANY, OF NORTH ST. PAUL, MINNESOTA, A CORPORATION OF MINNESOTA.

POWER-TRANSMISSION MECHANISM.

Application filed November 29, 1918. Serial No. 264,497.

*To all whom it may concern:*

Be it known that I, LAWRENCE V. FRALEY, a citizen of the United States, residing at Chicago, in the county of Cook and State of Illinois, have invented a certain new and useful Improvement in Power-Transmission Mechanisms, of which the following is a full, clear, concise, and exact description, reference being had to the accompanying drawings, forming a part of this specification.

My invention relates to improvements in power transmission devices or mechanisms and has special reference to improvements in speed reducing mechanisms especially adapted for hoist gear and similar applications of power.

The object of my invention is to provide a power transmission mechanism adapted to receive power at relatively high rotative speed on one shaft and deliver it to or upon another shaft at a greatly reduced speed and reversible to provide motion in either direction, and so constructed and organized as to reduce internal friction and consequent loss of power to a minimum, to provide a mechanism which shall be exceedingly strong and durable and one which, while encased to protect the working parts from sand and grit, shall be capable of being readily opened for examination, cleaning and adjustment.

In the modern or recent development of the application of power to the conveying of materials, it is a pre-requisite that the power transmission devices used in connection therewith shall be as nearly proof against wear and breakdown as possible, so that the operations effected thereby shall not be subject to interruptions. A further provision is the complete protection of the gearing against entry of foreign matter as well as protection of the operator or attendants from being caught by the gears and protection of materials conveyed or otherwise coming adjacent the device. My improvements are directed to the end of providing a speed reduction device or power hoist of the character outlined which shall be capable of being continuously operated under full capacity without danger of breakdown and which shall be particularly adapted for use in a power hoist or a conveyor belt power head and the like, and adapted to rotate the driven shaft in either direction at a relatively low rotative speed.

A further object of my invention is to provide a worm shaft and associated antifriction lateral and thrust bearings which can be readily mounted in the housing, which shall be simple in construction, and easily assembled, and in which a single thrust bearing shall effectively hold the shaft longitudinally against movement in both directions.

My invention will be more readily understood be reference to the accompanying drawings, in which I have illustrated a preferred embodiment thereof, and by which I am enabled to attain the above mentioned and other objects.

Figure 1 of said drawings is a vertical, sectional view of a power transmission device made in accordance with my invention;

Figure 2 is a vertical, transverse section on the line 2—2 of Figure 1;

Figure 3 is a fragmentary, vertical transverse section on the line 3—3 of Figure 1; and Figure 4 is a sectional end view taken at an angle different from that shown in Figure 1 of the end cap providing access to the thrust bearing.

Figure 1:
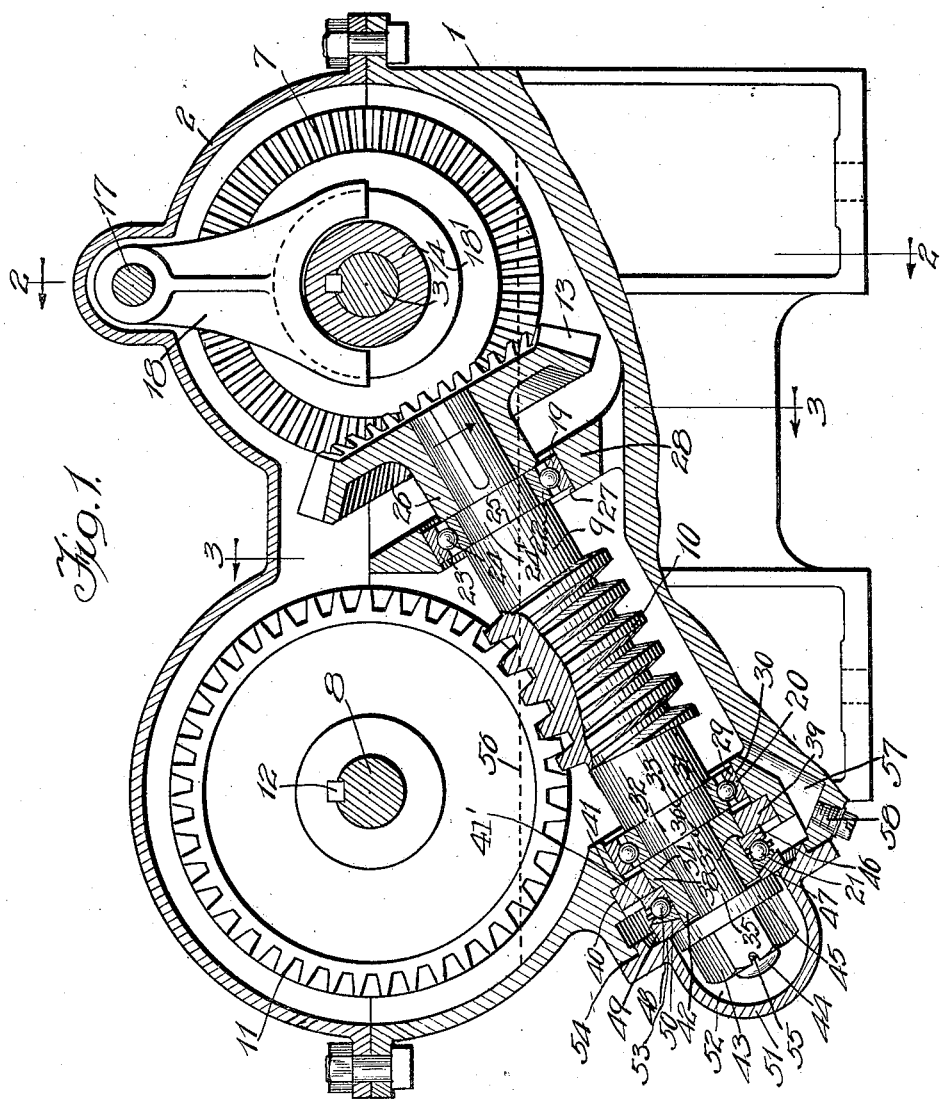

In said drawings 1 is a gear case or base, and 2 is the gear case cover, these two parts together form a closed housing for the transmission gearing. I provide a power shaft 3 mounted in bearings 4, one on each side wall 5 of the housing and adapted to be rotated by any suitable means and at a relatively high speed. The shaft is held against endwise movement in its bearings by any suitable means such as set collars 6 on the outer ends of the shaft and adapted to contact with the outer ends of the bearings 4. These bearings are divided on the joint between the cap and the base and hence when the cap is lifted the shaft 3 is removable.

Within the housing I mount two similar opposed beveled gears 7 on the shaft 3. These bevel gears face each other and the outer ends of their hubs are adapted to contact with the side walls 5 of the housing. I provide a second horizontal shaft 8 parallel with the shaft 3 and by which I deliver power from the mechanism. In other words, the shaft 3 is the driving shaft and the shaft 8 is the driven shaft. The shaft 8 is also mounted in bearings which are divided upon the joint between the base and the cap of the housing, similar to the mounting of the shaft 3 and is consequently likewise removable upon the removal of the cap.

To transmit power from the shaft 3 to the shaft 8 and to reduce the rotative speed and likewise increase the rotative effort, I provide a worm shaft 9 rotatably mounted in the housing, preferably below the shafts 3 and 8, and carrying a suitable worm 10, and I provide a co-operating worm wheel 11 mounted on the shaft 8 and rotatably attached thereto by the key 12 to rotate therewith. I preferably arrange the worm shaft extending beneath the driven shaft 8 as shown and in an inclined position and I provide a bevel gear 13 secured on the upper end of the worm shaft 9 and arrange to properly and permanently mesh with both of the bevel gears 7 which are carried by the power shaft 3. It will be obvious that by driving one or the other of the gears 7 from the power shaft 3, the driven shaft 8 will be caused to rotate in one direction or the other as desired. In order to clutch the gears 7 to the shaft 3 for rotation therewith I provide a clutch sleeve 14 slidably mounted on the shaft 3 between the gears 7 and provided on its ends with clutch projections 15 adapted to engage in similar clutch openings 16 in the inner end of the hubs of the gears when the clutch sleeve is moved endwise on the shaft 3. I control the clutch sleeve by a horizontal control shaft 17 which is mounted in the walls 5 above the shaft 3 and which carries a shifter arm 18 secured thereto, the lower end of which shifter arm engages in a circumferential groove 18' which I provide in the clutch sleeve. The shaft 17 is slidable endwise in its bearings causing the engagement of the clutch sleeve as described for causing the rotation of the driven shaft 8 in either direction, and through the medium of the worm 10 and worm 11 I reduce the speed and increase the rotative effort accordingly. The shaft 17 extends out of the housing and may be engaged by any suitable means for moving it endwise and holding it in its adjusted positions.

For rotatably mounting the worm shaft and for reducing or eliminating the end thrust friction I mount the worm shaft on an anti-friction bearing 19 at its upper end, adjacent to the gear 13 and a similar bearing 20 at its lower end, and I provide a thrust ball bearing 21 at the lower end of the shaft to offset or take up the thrust on the worm shaft in both directions. The bearing 19 comprises an inner ball race 22, an outer similar race 23, and a ring of balls 24 between the two races. The inner race 22 tightly fits a reduced part 24' of the shaft 9 and is held longitudinally on the shaft between a shoulder 25 at its lower side and the adjacent end of the hub 26 of the gear 13. The outer ring 23 fits within a bored hole 27 in a cross wall 28 of the housing.

At the lower end of the shaft the ball bearing 20 is similar to the bearing 19, its outer race 29 being similarly mounted in a bore 30 which is axially aligned with the bore 27. The inner race 31 of the bearing 20 tightly fits a reduced part 32 of the shaft 9 and is held in one direction by a shoulder 33 on the shaft at its upper edge. I hold the inner race 31 tightly clamped against the shoulder 33 by means of a sleeve 34, which fits upon a further reduced part 35 on the shaft 9. This sleeve engages a circumferential shoulder 36 at its upper end and overlaps the lower edge of the inner race 31. The shoulders 33 and 36 are spaced apart substantially equal to the width of the race 31. I provide the sleeve 34 with a circumferential shoulder 37 on its outer surface adjacent to its upper or inner end and spaced from its extreme inner end to provide a cylindrical surface 38' adapted to receive a washer or spacing collar 39. This spacing collar fits, at its circumference, within a cylindrical counterbore 40 which is larger than the bore 30 in which the bearing race 29 is mounted, and I thus provide a circumferential shoulder 41 in the housing against which the upper face of the spacing collar 39 contacts. The shoulder 41 is slightly beyond the lower edge of the race bearing 29.

The race rings 23 and 29 are free to move longitudinally in their respective bores to permit them to accurately align with their respective inner races.

I clamp the spacing ring 39 against the shoulder 41 and the sleeve 34 against the inner race ring by means of the thrust ball bearing 21, which is mounted on the extension 42 of the sleeve 34, and a clamping nut 43 on the outer or lower end of the shaft 9 I provide the shaft 9 with a reduced threaded end 44 to receive the nut 43. Between the nut 43 and the thrust bearing 21 I interpose a washer disc 45 adapted to engage an outer part of the thrust bearing and force the thrust bearing against the shoulder 37 on the sleeve 34. As I prefer to arrange the thrust bearing, it comprises an upper or inner ball race 46, fitting the cylindrical extension 42 of the sleeve 34 and adapted to contact at its back or upper side with the shoulder 37, and a lower race 47 also fitting on the extension 42 and each provided with a groove for receiving a row of balls 48. The race 47 is adapted to be held pressed toward the race 46 and upon the row of balls 48 by the nut 43 and the collar 45, but instead of arranging the collar 45 in direct contact with the race 47, I interpose a bearing ring 49 beneath the washer 45 and I provide a spherical joint bearing 50 between the bearing ring 49 and the back of the lower race 47, the function of which will appear hereinafter. As thus described, the shaft is held against moving upwardly through the bores 27 and 30, this being effected in the last instance by the engagement of the collar 39 with the shoulder 41 of the housing. To hold the shaft against movement in the opposite or downward direction, I provide a cap or closure 51 with which I close the opening 52, of the housing, through which access to the lower end of the shaft 9 and its bearings is provided. This cap is secured in place on the housing by bolts 51', and I so arrange the several rings of the collars constituting the bearings at the lower end of the shaft 9 that the inner face 53 of the cap 51 contacts with the back or lower face of the bearing ring 49. I provide an oil tight joint between the cap 51 and the housing by paper or similar packing 54 and should the cap 51 bind the bearing too tightly, when secured in place, I can adjust its position by changing the thickness of the packing. The closure thus serves through the medium of the thrust bearing as a shoulder to prevent the downward endwise movement of the worm shaft. It should be understood that the several rings of the thrust bearing are not held tightly bound between the nut and the shaft or between the closure 51 and the shoulder 41 in the housing, but sufficient clearance is allowed to permit the thrust bearing to serve efficiently as a stop in both directions. To retain the nut 43 in its adjusted position I preferably secure it with a cotter pin 55 which I insert through suitable registering openings in the nut 43 and the shaft 9. When the shaft 9 rotates in the direction of the arrow on Figure 1 of the drawings it tends to move upwardly through its bearings and at such time the nut 43 presses the bearing collar 49 against the thrust bearing and any clearance or slack between the closure 52 and the shoulder 41 appears between the bearing ring 49 and the closure and consequently the bearing ring is free of the adjacent face of the closure and can rotate freely with a nut 43. At the same time, at the opposite side of the thrust bearing, clearance will appear between the back of the upper ball race 46 and the shoulder 37 on the sleeve 34, thus freeing this upper race 46 from rotative friction on the shaft and permitting it to be held stationary by its contact with the shoulder 41 in the housing, with which the outer portion of its upper or back face contacts. In this action of the bearing, the thrust is taken by the balls 48, the lower race turning with the shaft 9 and the upper race being stationary. When the shaft 9 rotates in a direction opposite to the arrow in Figure 1, the shaft has to be held against a downward movement through its bearings. At such time the thrust bearing is pressed between the shoulder 37 on the sleeve 34 and inner face of the closure cap 51. In this condition the clearance appears between the upper race 46 and the shoulder 41' of the housing, thus permitting the race to revolve with the shaft and at the other end the clearance appears between the washer 45 and the bearing ring 49, thus relieving this point of friction and permitting the bearing ring 49 to remain stationary by reason of its being pressed against the stationary cap 51. It is thus seen that under this condition also the thrust bearing serves to eliminate the friction between the worm shaft and the housing. In other words, the single row of balls serves as an anti-friction bearing for thrust in both directions. It will now be clear that the spherical surface 50 is to permit the bearing ring 49 to adjust itself into flat contact with the washer 45 at one time and with the inner face of the cap 51 at another time, and as these two surfaces may not lie accurately in the same or in parallel planes, due to slight inaccuracies in methods of manufacture, this function of the bearing ring 49 is of value.

I pack the joint between the closure 51 and the base so that I can use the base as an oil reservoir particularly to keep the worm and worm wheel well lubricated, and I preferably fill the base with oil up to the dotted line 56 shown in Figure 1 which is sufficient to cover the contacting teeth of the worm and gear. I provide a drain hole 57 in the lower part of the base, preferably closing same by a removable screw plug 58. It will be noted that the lower parts of the gears 7, 13 and 11 dip below the surface of the oil and the worm 10 runs in oil. The bearings of the shaft 9 also run in oil. This makes the device a self-oiling unit for all parts contained within the casing.

The assembly of the device is rendered easy and convenient by the design and construction described. The shaft 9 with the worm 10 and the upper bearing and bevel pinion 13 in place is first inserted through the hole in the upper wall 28, the outer race 19 sliding in place in the bore 27. The lower bearing may then be inserted in place on the reduced portion 32 of the shaft 9. The thrust bearing may thereafter be put in place and the bottom of the casing closed by the cap 51.

It will now be clear that I have provided a speed reducing mechanism which is simple in construction, easily examined and adjusted, in which a single thrust bearing serves to hold the worm shaft in both directions and which is exceedingly compact and strong.

I claim:

1. In combination, a pair of horizontal shafts having split bearings, gears on the shafts, a casing for the gears, said casing comprising a base portion and a cover portion split on the line of the split bearings, a diagonal shaft mounted in the base portion and having a driving relation with each of said gears, and a body of oil in the base portion contacting with the lower portion of the gears and with the mounting of the diagonal shaft.

2. In combination, a pair of parallel shafts, a worm wheel on one shaft, a pair of bevel gears on the other shaft, means on the other shaft for clutching said bevel gears one at a time to the shaft, a diagonal shaft having a worm engaging with the worm wheel and having a bevel gear engaging with both of said first named bevel gears, a casing enclosing the worm and worm wheel and the bevel gears, said casing having bearings therein for the diagonal shaft, and a body of oil contained in the lower part of the casing, said body of oil being in contact with the worm and worm wheel and the bevel gears and in contact with bearings for the diagonal shaft.

3. In a device of the class described, a casing comprising a base member and a cover, said base member having a foot or pedestal portion for mounting the same, and having a hollow portion comprising a diagonal bore and a closure for said diagonal bore, said closure comprising a cap, a diagonal shaft mounted in said diagonal bore and having bearings therein, a worm on said diagonal shaft, a worm wheel within the casing engaging said worm, a bevel gear at the upper end of said shaft and a bevel gear within the casing engaging said first named bevel gear.

4. In combination, a casing comprising a base portion and a cover portion, a foot or pedestal member for the base portion, said base member having a hollow portion adapted to receive a worm wheel and a bevel gear, a diagonal bore in said base providing bearings, a diagonal shaft mounted in said bearings, a worm on the shaft engaging said worm wheel, a bevel gear on the upper end of the shaft engaging said first named bevel gear, and a thrust bearing for the diagonal shaft mounted between said cap and a portion of the base.

5. In combination, a pair of shafts arranged in parallel relation, a worm wheel on one shaft, a bevel gear on the other shaft, a diagonal shaft having means for connecting said worm wheel and said bevel gear, a casing enclosing said gears, said casing comprising a base portion and a cover portion divided on a line passing through the axes of the parallel shafts, said base portion comprising a diagonal bore having bearings for the diagonal shaft, a cap for the end of the bore, and a thrust bearing between the cap and the portion of the base.

6. In combination, a substantially horizontal shaft, a worm wheel on said shaft, a casing enclosing said worm wheel and providing bearings for said shaft, said casing having a diagonal bore closed at its lower end, a worm shaft journaled in said bore and a thrust bearing at the lowermost portion of said bore, said casing being adapted to contain a body of lubricant, and means disposed within the casing and being maintained in contact with said body of lubricant for driving said diagonal shaft.

7. In combination, a casing, a wheel shaft journaled in the casing, a gear shaft also journaled in the casing, a pair of facing bevel gears in the casing, a diagonal worm shaft journaled in the casing, said shaft lying below the wheel shaft, a thrust bearing for said worm shaft, said worm shaft having a worm meshing with the wheel and having a bevel wheel meshing with said facing gears and a body of lubricant in the casing into which the lower parts of the wheel, worm and bevel gears all project and said thrust bearing being submerged in said body of lubricant.

8. In combination, a pair of parallel shafts, gears mounted on said shafts, a casing enclosing said gears, a diagonal shaft wholly mounted in said casing, said shaft having means for engaging the gears on the parallel shafts in connecting relation, bearings at each end of the diagonal shaft, said bearings comprising a thrust bearing positioned at the lower end of the casing, said casing having a shoulder therein for receiving the thrust in one direction and a removable cap over the lower end of the shaft for receiving the thrust in the other direction, said casing being adapted to contain a body of lubricant.

9. In combination, a pair of shafts, gears mounted on said shafts, a casing enclosing said gears, a diagonal shaft wholly mounted in the casing, said shaft having means for engaging the gears on the two shafts in connecting relation, bearings at each end of the diagonal shaft, said bearings comprising a thrust bearing at the lower end of the shaft, means at the lower end of the shaft for tightening said thrust bearing, said casing having an opening at the lower end of the diagonal shaft for boring out the bearings of said shaft and a cap closing said opening, said cap providing means for receiving the end thrust of the diagonal shaft in one direction.

In witness whereof, I hereunto subscribe my name this 25th day of November, A. D. 1918.

LAWRENCE V. FRALEY.